United States Patent [19]

DeClerck et al.

[11] Patent Number: 5,624,245

[45] Date of Patent: Apr. 29, 1997

[54] CENTRUFUGAL PUMP WITH THERMALLY ISOLATED AND DYNAMICALLY AIR COOLED SHAFT SEAL ASSEMBLY

[75] Inventors: David M. DeClerck, Utica; Gregory S. Muller, Troy, both of Mich.

[73] Assignee: MP Pumps, Inc., Fraser, Mich.

[21] Appl. No.: 329,172

[22] Filed: Oct. 26, 1994

[51] Int. Cl.$^6$ .................................................. F04B 17/00
[52] U.S. Cl. ..................... 417/373; 417/366; 417/423.8; 417/423.11; 415/177; 415/178; 415/180; 415/111
[58] Field of Search ........................ 415/177, 178, 415/180, 111, 244 R; 417/366, 373, 423.8, 423.11

[56] References Cited

U.S. PATENT DOCUMENTS

| | | | |
|---|---|---|---|
| 1,400,323 | 12/1921 | Sherbondy | 417/373 |
| 1,611,547 | 12/1926 | Miller | 416/244 |
| 2,203,525 | 6/1940 | Dupree, Jr. | 415/111 |
| 2,239,228 | 4/1941 | Hankinson | 415/180 |
| 2,423,825 | 7/1947 | Blom | 417/423.11 |
| 3,056,354 | 10/1962 | Gerard . | |
| 3,076,412 | 2/1963 | Harker et al. | 415/180 |
| 3,088,416 | 5/1963 | Danis | 417/423.11 |
| 3,089,423 | 5/1963 | Raub . | |
| 3,217,656 | 11/1965 | Oakes . | |
| 3,467,014 | 9/1969 | Keyes . | |
| 3,478,689 | 11/1969 | Ball . | |
| 3,500,754 | 3/1970 | Boes . | |
| 3,554,661 | 1/1971 | Oglesby . | |
| 3,600,101 | 8/1971 | Oglesby | 415/111 |
| 3,630,529 | 12/1971 | Ball | 277/56 |
| 3,914,072 | 10/1975 | Rowley | 417/423.11 |
| 3,941,395 | 3/1976 | Ball et al. | 277/41 |
| 3,947,154 | 3/1976 | Klepp . | |
| 4,109,920 | 8/1978 | Wiese | 415/180 |
| 4,114,899 | 9/1978 | Kulzer | 417/177 |
| 4,239,462 | 12/1980 | Dach . | |
| 4,720,248 | 1/1988 | Dernedde . | |
| 4,979,875 | 12/1990 | Muller . | |
| 5,051,071 | 9/1991 | Haentjens . | |
| 5,195,867 | 3/1993 | Stirling | 415/111 |

FOREIGN PATENT DOCUMENTS

| | | |
|---|---|---|
| 728077 | 4/1955 | United Kingdom . |
| 965939 | 8/1964 | United Kingdom . |

*Primary Examiner*—Louis J. Casaregola
*Assistant Examiner*—Ted Kim
*Attorney, Agent, or Firm*—Baker & Daniels

[57] ABSTRACT

A high temperature, centrifugal pump includes a thermally isolated and dynamically air cooled shaft seal. Carbon graphite insulators formed of plural elements juxtaposed together (46) insulate the seal assembly (34) from the pump housing (16). A hollow drive shaft limits heat conducted from the impeller during operation while a fan (56) forcibly flows air past the seal assembly to conduct heat energy away from the shaft seal. The insulator (46) reduces heat energy conducted to the seal assembly (42).

6 Claims, 2 Drawing Sheets

CENTRUFUGAL PUMP WITH THERMALLY ISOLATED AND DYNAMICALLY AIR COOLED SHAFT SEAL ASSEMBLY

BACKGROUND OF THE INVENTION

The present invention relates to a pump for pumping high temperature liquids, such as hot oil.

A typical centrifugal pump used for pumping hot liquids usually includes a volute type housing, an adapter, an impeller on a shaft, and a mechanical shaft seal. The mechanical seal must be capable of sealing the hot liquid and containing it within the pump. A disadvantage in such construction of pumps is that seal costs increase greatly when the pump has to be designed to handle liquid temperatures exceeding 400° F.

In the past, to achieve high temperature shaft sealing, expensive and elaborate seals with hard faces or water cooling of the seal cavity with remote heat exchangers have been used. These heat exchangers are expensive to operate because of the large amount of cooling water required. As a result of past experience, there is a need for a pump that is not water cooled, does not use elaborate seals, and which is capable of pumping high temperature liquid.

Prior art pumps, such as those shown in U.S. Pat. No. 4,720,248 and Great Britain Patent Document 728077 disclose attempts made at thermally protecting the motor of the pump but do not contemplate attempting to reduce the temperature of the seal housings or seals. The aforementioned prior art patents show pumps that do not adequately address the problem of insulation of hot liquid from mechanical seals nor of seal wear.

Additionally, some prior air pumps, such those shown in U.S. Pat. No. 4,979,875, utilize long distances from the pump to the seal to allow for adequate dissipation of heat. In some applications it would be preferable for the pump unit to be made as small as possible.

SUMMARY OF THE INVENTION

The present invention overcomes the disadvantages of the above-described prior art centrifugal pumps by providing a carbon graphite insulator between the seal housing and an adapter adjacent the pump liquid to thermally insulate the mechanical seal. Such construction allows the pump to withstand fluid temperatures over 400° F.

Generally, the invention in one form thereof, provides a pump having a common volute type pump housing for mounting and liquid pressure/velocity conversion. An impeller is disposed therein to transfer shaft energy from a motor into the liquid. A seal housing is provided for supporting and thermal isolation of a mechanical seal. The seal and housing is thermally isolated from the pump housing by means of carbon insulators and a hollow drive shaft.

More specifically, a carbon insulator is mounted between the seal housing and the pump housing to reduce transfer of heat energy into the seal housing. The insulator maintains the temperature in the seal housing below that of the liquid that is being pumped. A hollow drive shaft further assists in thermally isolating the seal housing. A commercially available bellows type end face shaft seal is used in the seal housing and is located onto and driven by the drive shaft. The seal housing has internal and external cast fins to aid in cooling.

In one form of the invention, a fan clamped on the drive shaft provides positive mechanical engagement between the drive shaft and the motor while causing air to move across the seal housing via rotating fan blades thereby cooling the cavity with forced air convection.

An advantage of the pump of the present invention is that the seal cavity, including the mechanical seal, is cooled via a forced convection of air and thermally insulated from the pump liquid by the carbon graphite insulator thereby reducing heat transfer to the seal. With external air cooling, reduction of seal oil temperature as great as 370° F. below pumpage temperature is possible.

Another advantage of the pump of the present invention is that of reduced cost by use of a simple mechanical seal between the hot liquid and drive shaft.

A further advantage of the pump of the present invention is that pump down time is reduced since oxidation and coking of the seal is reduced by the minimized seal operating temperature. Initial and operating costs are reduced as compared to a pump having high temperature, elaborate seals and other cooling devices. An additional backup lip seal reduces oxidation of the mechanical seal by limiting the amount air able to reach the mechanical seal.

Yet another advantage of the pump of the present invention is that of a close coupled design that eliminates coupling misalignment and provides for compact integration within a heating system unit. The close coupling allows the rotating assembly to be removed without disturbing associated piping when routine maintenance must be performed. A byproduct of the close coupled design is that the pump unit is shorter in length that prior pumps, reducing the amount of space needed for the pump.

Another advantage of the pump of the present invention is that the seal cavity vents all entrapped gas on startup and no additional venting procedure is required.

The invention, in one form thereof, provides a high temperature liquid pump for attachment to a motor including a pump casing having an end wall and a pump housing. An impeller is rotatably disposed within the pump housing for pumping high temperature liquid. A drive shaft connects the motor to the impeller with the drive shaft passing through the end wall. A seal assembly including a seal housing having a mechanical seal is located about the drive shaft and connected to the pump housing. A carbon graphite insulator is disposed between the pump housing and seal housing to reduce heat transfer from the pump housing to the seal and seal housing.

In one form of the invention, the drive shaft is hollow between the impeller and seal whereby the seal housing is further insulated to reduce heat energy entering from the pump housing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
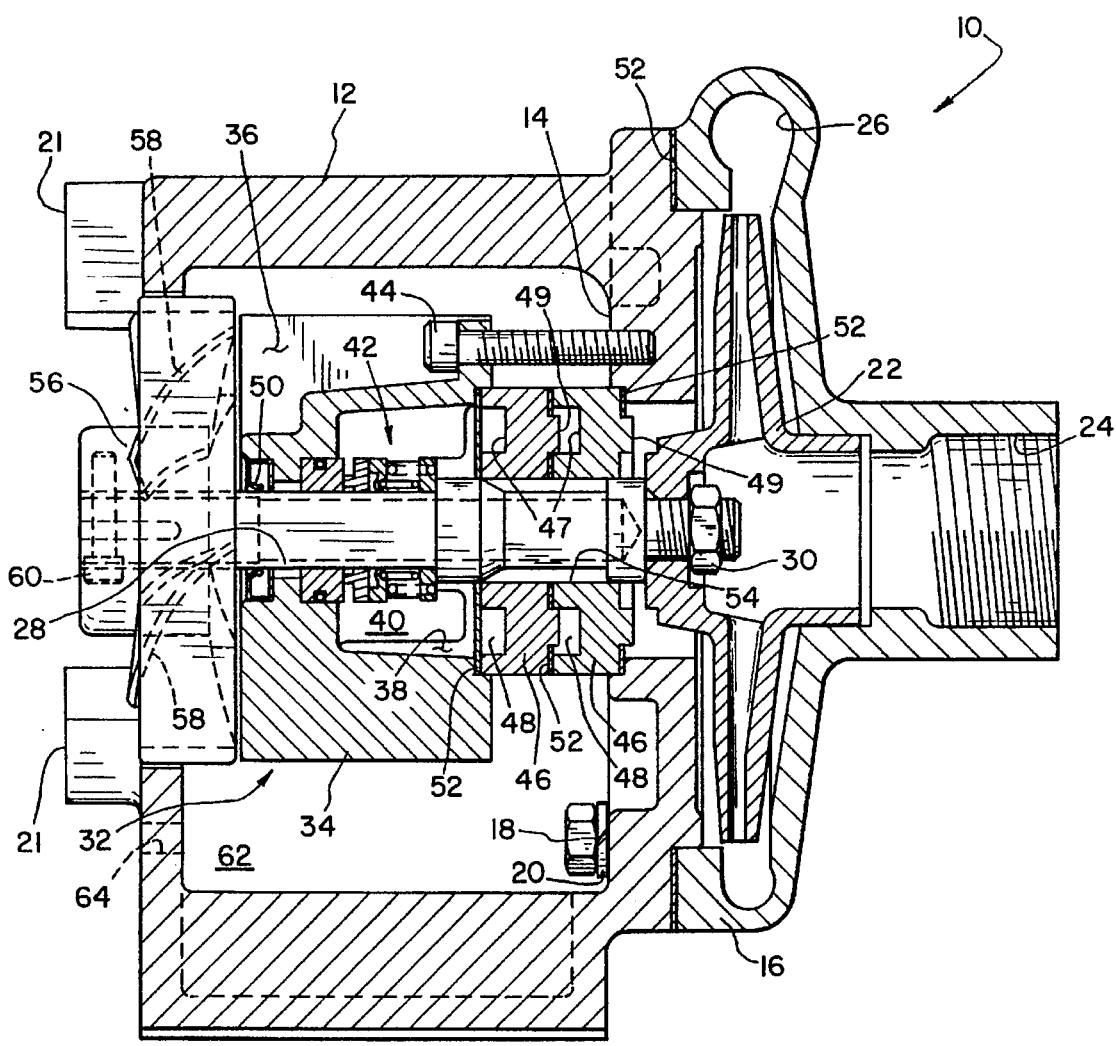
FIG. 1 is a longitudinal sectional view of a preferred embodiment of a pump of the type to which the present invention pertains.
Figure 2:
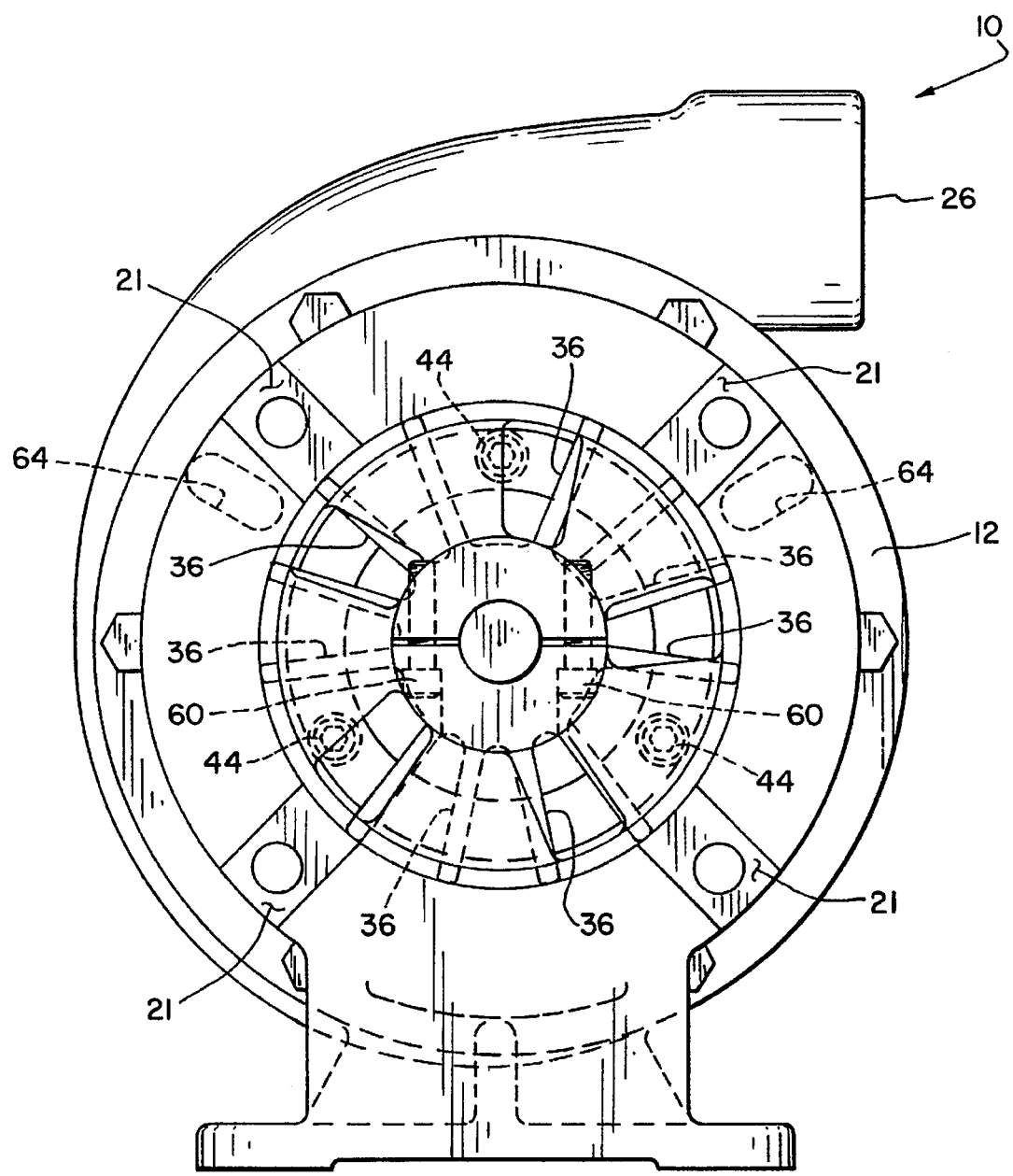
FIG. 2 is an end elevational view of the pump of FIG. 1.

In an exemplary embodiment of the invention as shown in the drawings and particularly referring to FIG. 1, a high temperature pump 10 includes a ductile iron pump adapter casing 12 having an endwall 14 and having a pump housing 16 attached to endwall 14 by a plurality of screws 18 with associated lock washers 20. Casing 12 includes four mounting brackets 21 formed on a rear surface opposite end wall 14 to which attaches a motor (not shown) to drive pump 10.

A cast iron impeller 22 is rotatably disposed within pump housing 16 for pumping high temperature liquid, such as hot oil, from a liquid inlet 24 and out through liquid outlet 26. Impeller 22 may be of the enclosed type as shown or a semi-open type as known in the art. A thin walled, stainless steel, sleeve-type drive shaft 28 connects from a motor (not shown) to impeller 22 through casing 12 and endwall 14. A jam nut 30 locks impeller 22 onto drive shaft 28.

A seal assembly 32 is utilized to mechanically seal drive shaft 28 to prevent leakage. Seal assembly 32 includes a ductile iron seal housing 34 disposed in air filled interior cavity 62 of casing 12 substantially separated and spaced apart by an air gap from both casing 12 and pump housing 16 for increased heat transmission away from the mechanical seal 42. The surfaces of seal housing 34 include a plurality of external fins 36 and internal fins 38 to efficiently radiate heat. A chamber 40 is formed in seal housing 34 about drive shaft 28 onto which is located a mechanical seal 42 which mechanically seals oil or liquid within chamber 40 from passing between seal housing 34 and drive shaft 28 to the area of fan 56. A plurality of bolts 44 attach seal housing 34 to endwall 14 of casing 12. A backup lip seal 50 of conventional construction is located on seal housing 34 about drive shaft 28. This seal 50 reduces oxidation of the mechanical seal 42 by limiting air flow past drive shaft 28.

Mechanical seal 42 is preferably a standard mechanical seal that requires no service adjustment. A preferred type of mechanical seal commercially available for use is a Type 2 seal from John Crane, Inc. of Morton Grove, Ill.

As shown in FIG. 1, carbon graphite insulators 46 are disposed between endwall 14 of casing 12 and seal housing 34. Preferably, carbon graphite insulators are of the type sold by Carbide Technology of Hartford, Conn., Grade No. CTI-87, although other insulators may be utilized. Insulators of low thermal conduction in the range of approximately 5 to 9 BTU/hr ft °F. may be used. In particular, the preferred CTI-87 insulator has a thermal conductivity of approximately 5 BTU/hr ft °F. Each insulator 46 includes an annular recess 47 on one side and a small annular protuberance 49 on an opposite side. The stacking of the two carbon graphite insulators 46 with a protuberance 49 of one interfitting into a recess 47 of another forms an annular air pocket 48 which assists in insulating against heat transfer. Stagnate air within air pocket 48 assists insulator 46 in reducing heat flow from pump housing 16 to seal housing 34. Other equivalent mechanisms for creating volumes of stagnate air in and between insulators 46 may be used.

As shown in FIG. 1, gaskets 52 may be located between sealing surfaces as between casing 12 and pump housing 16 and between carbon graphite insulators 46.

An annular passage 54, between drive shaft 28 and carbon graphite insulators 46, permits pumpage to flow between the intake area of pump housing 16 and reservoir 40. At initial pump startup, pumpage will pass from pump housing 16 through annular passage 54 into reservoir 40 to assist in lubricating mechanical seal 42. After reservoir 40 is filled, little liquid circulates through annular passageway 54.

To assist in cooling of pump 10 and specifically seal assembly 32, an external air cooling system is provided having a shaft driven fan 56 having fan blades 58. Fan 56 is formed in two halves about a plane through the axis of fan rotation. Fan 56 is directly clamped to drive shaft 28 by means of bolts 60 passing through and connecting each half of fan 56 about drive shaft 28. Fan 56 and bolts 60 together attach drive shaft 28 to the power output shaft of a motor (not shown) by causing the two halves of fan 56 to clamp both drive shaft 28 and output shaft therebetween. Bolts 60 are oriented transverse to the axis of fan rotation to connect the two halves of fan 56 together.

During operation, the output shaft of the motor will rotate drive shaft 28 connected by means of fan 56 and bolts 60. As drive shaft 28 rotates, impeller 22 will rotate within pump housing 16 causing high temperature oil or other liquids to be drawn into inlet 24 and slung outwardly and through liquid outlet 26. At initial startup a small quantity of hot liquid will flow through annular passage 54 into seal chamber 40 to lubricate mechanical seal 42. Cooling of pump 10, particularly the mechanical seal 42, is caused by the insulative effect of carbon graphite insulators 46, air pockets 48, along with the forced air cooling created by the rotation of fan 56. Heat energy is additionally withdrawn from reservoir 40 and mechanical seal 42 by internal fins 38 that conduct heat energy into the body of seal housing 34. Fan blades 58 of fan 56 will cause air to flow over blades 58 and past the exterior fins 36 of seal housing 34, thereby picking up heat and pulling it away from seal housing 34 and mechanical seal 42 into the interior 62 of casing 12. After picking up heat, air will then flow out of interior 62 through a plurality of air holes 64.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A high temperature liquid pump comprising:

a pump housing having an end wall;

an impeller rotatably disposed in said pump housing;

a drive shaft connected to said impeller, said drive shaft passing through said end wall;

a seal housing enclosing a mechanical seal located about said drive shaft, said seal housing spaced apart from said pump housing; and a thermal insulator disposed between said pump housing and said seal housing and spacing apart said housings to reduce heat transfer from said pump housing to said seal housing;

wherein said insulator is formed of plural elements axially juxtaposed to each other; and wherein each said element includes a protuberance on one side and a recess on an opposite side, said protuberance of one element interfitting into the recess of an axially juxtaposed element.

2. The pump of claim 1 in which said recess located between said axial juxtaposed elements creates an air pocket to decrease heat flow therethrough.

3. The pump of claim 1 wherein said thermal insulator comprises a thermal conductivity of between about 5 and 9 BTU/hr ft °F.

4. The pump of claim 3 wherein said thermal insulator comprises a thermal conductivity of about 5 BTU/hr ft °F.

5. A high temperature liquid pump comprising:

a pump housing having an end wall;

an impeller rotatably disposed in said pump housing;

a drive shaft connected to said impeller, said drive shaft passing through said end wall;

a seal housing enclosing a mechanical seal located about said drive shaft;

a thermal insulator disposed between said pump housing and said seal housing and spacing apart said housings, wherein said insulator is formed of plural elements axially juxtaposed to each other, and wherein each said element includes a protuberance on one side and a recess on an opposite side, said protuberance of one element interfitting into the recess of an axially juxtaposed element; and wherein said seal housing is supportably mounted to said insulator in spaced apart relationship with said pump housing to define a gap for cooling air, wherein said gap and said insulator between said pump housing and said seal housing reduces heat transfer from said pump housing to said seal housing.

6. The pump of claim 1 in which said recess located between said axial juxtaposed elements creates an air pocket to decrease heat flow therethrough.

* * * * *